G. W. PHILLIPS.
SHARPENER.
APPLICATION FILED FEB. 14, 1919.
1,337,154.                                      Patented Apr. 13, 1920.
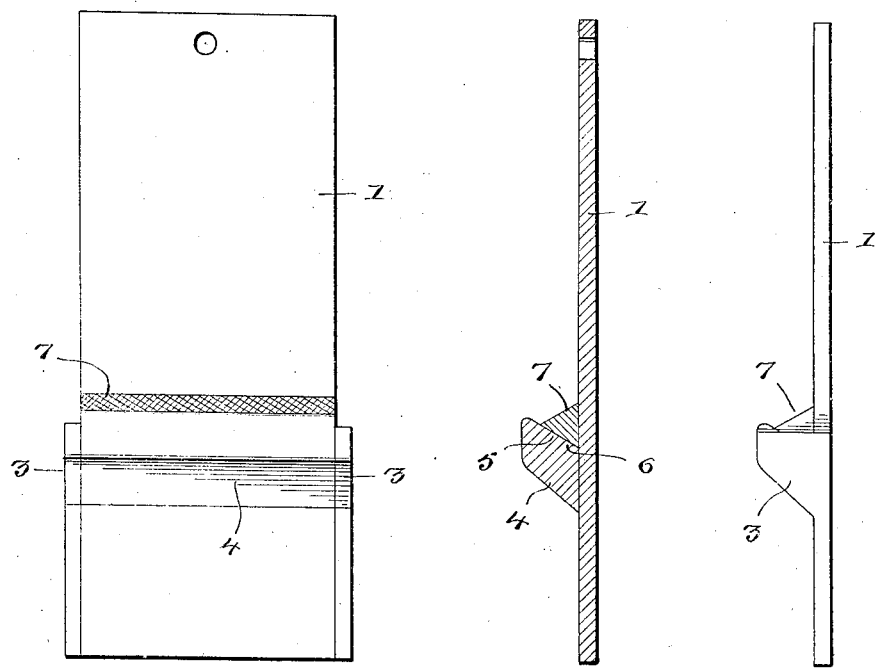
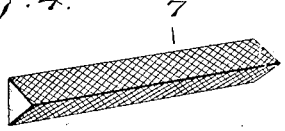
Inventor
G. W. Phillips
Victor J. Evans
Attorney.

UNITED STATES PATENT OFFICE.

GEORGE W. PHILLIPS, OF SAWYER, KANSAS.

SHARPENER.

1,337,154.  Specification of Letters Patent.  Patented Apr. 13, 1920.

Application filed February 14, 1919. Serial No. 277,016.

*To all whom it may concern:*

Be it known that I, GEORGE W. PHILLIPS, a citizen of the United States, residing at Sawyer, in the county of Pratt and State of Kansas, have invented new and useful Improvements in Sharpeners, of which the following is a specification.

This invention relates to a novel construction of sharpening device for shears and scissors and the principal object of the invention is to provide means for sharpening the scissors and at the same time properly beveling the cutting edges.

Another object of the invention is to provide a cutting member provided with a plurality of cutting edges, with means for reversing the said member to bring any desired cutting edge in cutting position.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the device.

Fig. 2 is a longitudinal section.

Fig. 3 is an edge view.

Fig. 4 is a view of the cutting member.

In these views, 1 indicates an elongated plate having a hole at one end thereof by which the device may be hung up. The plate is provided with side wings 3 which are suitably secured to or formed with said plate. The upper edges of the wings are straight and the lower edges are inclined as shown.

A block 4 is placed between said wings with one side thereof connected with the plate. This block is of the same shape as the wings but its upper face is inclined as at 5 to provide a pocket 6 between itself and the plate, the ends of the pocket being formed by the wings. Thus it will be seen that one wall of the pocket is straight while the other wall is inclined. 7 indicates the sharpening member which is of triangular form and has its three sides roughened similarly to a file. This member is placed in the pocket and is so formed as to fit snugly therein. It will be seen that the exposed side of the cutting member is located at an incline to the face of the plate so that when the blade of the shears is placed on the plate its beveled cutting edge will engage the exposed surface of the cutting member so that when the blade is moved back and forth the cutting edge thereof will be sharpened by said member. The said member may be removed from the pocket and replaced to bring a new side into cutting position and said member may be turned end to end, as the ends of said member will wear quicker than the body thereof.

What I claim is:—

1. A device of the class described comprising a plate, a block connected with one face thereof and having its upper side extending at an angle from said plate so as to form a pocket with an inclined wall and a triangular shaped cutting member seated in said pocket.

2. A device of the class described comprising a plate, a block connected with one face thereof and having its upper side extending at an angle from said plate so as to form a pocket with an inclined wall, side pieces closing the ends of said pocket and a triangle shaped cutting member fitted in said pocket.

In testimony whereof I affix my signature.

GEORGE W. PHILLIPS.